(12) United States Patent
Iellimo

(10) Patent No.: US 10,745,198 B1
(45) Date of Patent: Aug. 18, 2020

(54) FORMED SUPPORT MEMBER WITH ANTIROTATION FEATURE

(71) Applicant: Frazier Industrial Company, Long Valley, NJ (US)

(72) Inventor: Domenick Iellimo, Forked River, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 16/518,111

(22) Filed: Jul. 22, 2019

(51) Int. Cl.
*B65G 1/04* (2006.01)
*A47B 96/02* (2006.01)
*A47B 47/00* (2006.01)
*B65G 1/02* (2006.01)
*A47B 47/02* (2006.01)

(52) U.S. Cl.
CPC ............ *B65G 1/04* (2013.01); *A47B 47/0041* (2013.01); *A47B 47/0058* (2013.01); *A47B 47/0083* (2013.01); *A47B 47/027* (2013.01); *A47B 47/028* (2013.01); *A47B 96/021* (2013.01); *B65G 1/02* (2013.01)

(58) Field of Classification Search
CPC . A47B 47/0058; A47B 47/027; A47B 96/021; A47B 96/1441; A47B 47/0041; A47B 47/0083; A47B 47/021; A47B 47/028; A47B 57/50; A47B 57/402; A47B 57/22; A47B 57/487; A47B 57/40; A47B 57/425; A47B 57/58; A47B 57/00; A47B 57/16; A47B 96/06; A47B 96/00; A47B 96/02; A47B 96/14; A47B 57/06; A47B 57/08; A47B 57/30; A47B 57/32; A47B 57/34; A47B 57/48; A47B 57/482; A47B 57/485; A47B 96/024; A47B 96/028; A47B 96/067; A47B 47/0025; A47B 47/024; A47B 47/045; A47B 57/20; A47B 57/38; A47B 57/404; A47B 57/406; A47B 96/1416; A47F 5/01; A47F 5/13; A47F 5/101; A47F 5/132; A47F 5/14; B65G 1/02; B65G 1/04
USPC ....... 211/191, 192, 134, 182, 183, 189, 187, 211/186, 190, 193; 248/214, 22.21, 248/225.21, 300
See application file for complete search history.

(56) References Cited

U.S. PATENT DOCUMENTS

| | | | | |
|---|---|---|---|---|
| 2,918,176 A | * | 12/1959 | Bell | A47B 47/028 211/191 |
| 2,960,238 A | * | 11/1960 | Park | A47B 47/027 211/134 |
| 3,142,386 A | * | 7/1964 | Skubic | A47B 57/402 211/191 |

(Continued)

FOREIGN PATENT DOCUMENTS

EP 2253245 A1 11/2010

*Primary Examiner* — Jennifer E. Novosad
(74) *Attorney, Agent, or Firm* — Dilworth & Barrese, LLP

(57) ABSTRACT

A formed support member that is structurally steady and easy to manufacture is disclosed herein. The formed support member comprises a downwardly facing U-shaped body, a first flat end, a first engaging end, a second flat end and a second engaging end. The formed support member may comprise at least one hole on the engaging ends which allows the formed support member to be universally fastened to different sized horizontal beams for different storage needs.

19 Claims, 5 Drawing Sheets

(56) References Cited

U.S. PATENT DOCUMENTS

| | | | | |
|---|---|---|---|---|
| 3,268,089 A | * | 8/1966 | Hall | A47B 96/021 211/153 |
| 3,349,924 A | * | 10/1967 | Maurer | A47F 7/0042 211/41.1 |
| 3,556,306 A | * | 1/1971 | Shell | A47B 96/027 211/90.02 |
| 3,563,391 A | * | 2/1971 | Weltha | H05K 7/1418 211/41.17 |
| 3,584,904 A | * | 6/1971 | Lickliter | E04B 9/122 403/252 |
| 3,846,944 A | * | 11/1974 | Lambert | A47B 47/021 52/236.3 |
| 4,048,059 A | * | 9/1977 | Evans | A47B 96/024 108/155 |
| 4,078,664 A | * | 3/1978 | McConnell | A47B 96/00 108/159 |
| 4,261,470 A | * | 4/1981 | Dolan | F16B 12/36 108/55.1 |
| 4,293,076 A | * | 10/1981 | Collin | B65D 85/185 206/289 |
| 4,665,838 A | * | 5/1987 | Minshall | A47B 47/021 108/157.13 |
| 4,801,026 A | * | 1/1989 | Andersson | A47B 96/00 211/183 |
| 4,955,490 A | * | 9/1990 | Schafer | A47B 57/581 211/187 |
| 5,011,031 A | | 4/1991 | Konstant | |
| 5,207,336 A | | 5/1993 | Tyler | |
| 5,279,431 A | * | 1/1994 | Highsmith | B65G 1/02 211/187 |
| 5,310,066 A | * | 5/1994 | Konstant | A47B 47/022 108/109 |
| 5,415,301 A | * | 5/1995 | Bruton | A47B 96/1416 211/183 |
| 5,628,415 A | * | 5/1997 | Mulholland | A47B 47/027 211/186 |
| 5,769,249 A | | 6/1998 | Lascara | |
| 6,039,192 A | * | 3/2000 | Hollander | A47B 96/021 211/186 |
| 6,105,798 A | * | 8/2000 | Gruber | B65G 1/023 211/151 |
| 6,123,154 A | * | 9/2000 | MacDonald, III | A62C 35/68 169/16 |
| 6,173,846 B1 | * | 1/2001 | Anderson | A47B 47/027 211/183 |
| 6,450,350 B1 | * | 9/2002 | Krummell, Jr. | A47B 47/027 211/183 |
| 6,578,720 B1 | * | 6/2003 | Wang | A47F 5/0093 211/126.15 |
| 7,614,511 B2 | * | 11/2009 | Konstant | A47B 96/021 211/189 |
| 7,641,063 B2 | * | 1/2010 | Wishart | A47B 47/027 211/189 |
| 7,857,152 B2 | * | 12/2010 | Smith | A47F 5/01 211/181.1 |
| 7,891,507 B2 | * | 2/2011 | Shetler | A47B 55/00 211/135 |
| D637,427 S | * | 5/2011 | Troyner | D6/705.6 |
| 8,016,141 B2 | | 9/2011 | Konstant | |
| 8,443,992 B2 | * | 5/2013 | Lawson | A47B 47/028 211/187 |
| 8,827,090 B2 | | 9/2014 | Kropveld | |
| 9,027,767 B2 | * | 5/2015 | Buckley | A47F 5/00 211/134 |
| 9,215,931 B1 | * | 12/2015 | Offerman | A47B 96/024 |
| 9,226,575 B2 | | 1/2016 | Crowley | |
| 9,290,322 B2 | * | 3/2016 | Heijmink | A47B 47/0058 |
| 9,375,102 B2 | * | 6/2016 | Troyner | A47B 47/021 |
| 9,380,875 B2 | * | 7/2016 | Caldwell | A47B 96/021 |
| 9,386,855 B2 | * | 7/2016 | Sabounjian | A47B 96/14 |
| 9,834,960 B2 | * | 12/2017 | Chesterton | E05B 73/0094 |
| 2010/0026156 A1 | * | 2/2010 | Leconte | A47B 96/021 312/408 |
| 2011/0013976 A1 | | 1/2011 | Konstant | |
| 2011/0042336 A1 | * | 2/2011 | Cheng | A47B 57/40 211/153 |
| 2017/0280875 A1 | * | 10/2017 | Buckley | A47B 47/021 |
| 2018/0279782 A1 | * | 10/2018 | Liss | A47B 47/027 |

\* cited by examiner

FORMED SUPPORT MEMBER WITH ANTIROTATION FEATURE

BACKGROUND

Storage systems are used in warehouses, department stores, and storage facilities to store products thereon. The storage systems containing a plurality of storage racks may hold and support large amounts and often heavy materials. Storage racks often employ a number of vertical columns that are sturdily positioned on a base or floor, and then a plurality of horizontal supporting beams may connect to and be fastened to the vertical columns. Directly above the horizontal supporting beams and substantially perpendicular to the horizontal supporting beams, a number of support members can be used to provide a storage surface for shelves, pallets, mesh, etc. All of these components operate together in order to adequately support heavy weight of the materials. For example, the support members need to be structurally steady and easy to manufacture. Moreover, the support members may at times loosen or support so much weight that the support members begin to rotate, thereby hindering the ability of the storage rack to evenly and reliably support objects and other materials.

In addition, companies employing storage systems each have different sized storage racks for the respective company's particular purpose. For example, some storage racks may include horizontal support beams that have a height of three inches, three and a half inches, or four inches. For stability reason, a hole for fasten the support member to the horizontal support beams is drilled on the side surface and in the middle of the height, for example, at one and a half inch for a three inches beam, or at two inches for a four inches beam.

Each increasing height is able to hold more weight but may also be more costly to manufacture for the company. Thus, if the storage racks that employ three-inch height horizontal support beams are sufficient for a company's purpose, then the company will not need to spend additional money on the storage racks that employ three and a half inches or four inches height horizontal support beams. Some support members may not be affected by the size of the storage rack, and therefore the same sized support member may work and be employed for each varying sized storage rack. However, each support member may need to have a hole drilled in different locations thereon, in order to fasten the support member to the different sized horizontal support beams.

SUMMARY

A formed support member that is structurally steady and easy to manufacture is disclosed herein. The support member may include multiple holes drilled on the side engaging ends for universally adapting to multiple sized storage racks.

A formed support member comprises a downwardly facing U-shaped body elongated in an axial direction to form a storage surface; a first flat end extended from the U-shaped body in one direction along the axis and in the same horizontal plane defined by the storage surface; a first engaging end having a substantially perpendicular flat surface extended from the first flat end to embrace at least partially a first supporting beam underneath the first flat end; a second flat end extended from the U-shaped body in an opposite direction of the first flat end and in the same horizontal plane defined by the storage surface; and a second engaging end having a substantially perpendicular flat surface extended from the second flat end to embrace at least partially a second supporting beam underneath the second flat end.

DETAILED DESCRIPTION

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

Figure 1:
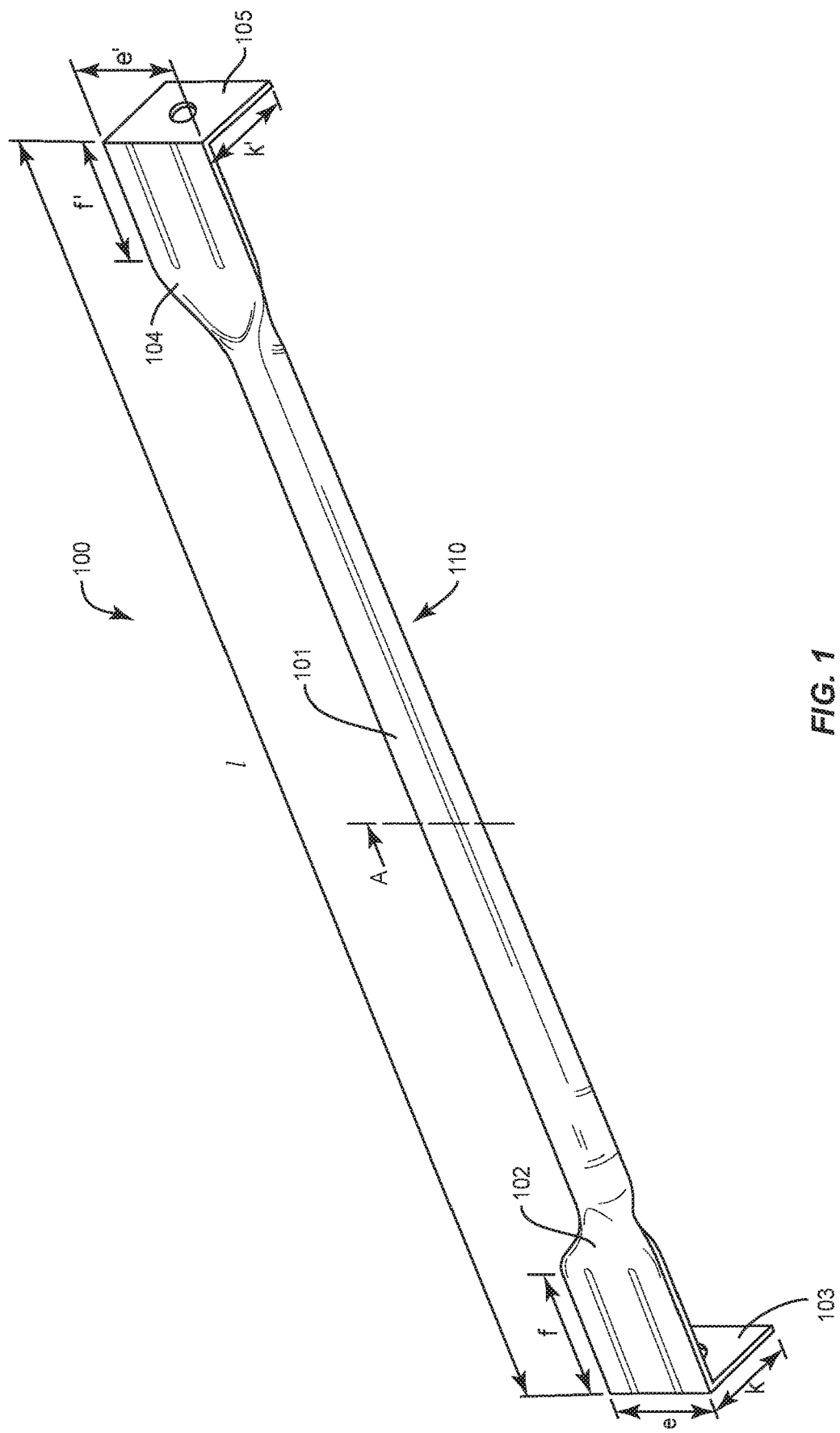
FIG. 1 illustrates a first embodiment of a formed support member of the storage rack in accordance with aspects of the present disclosure.

FIG. 1 illustrates a first embodiment of a formed support member of the storage rack in accordance with aspects of the present disclosure. The formed support member 100 includes a downwardly facing U-shaped body 110 elongated in an axial direction to form a storage surface 101. A first flat end 102 extends from the U-shaped body 110 in one direction along the axis and in the same horizontal plane defined by the storage surface 101. Extending from the first flat end 102 is a first engaging end 103 having a substantially perpendicular flat surface to embrace at least partially a first supporting beam underneath the first flat end 102. On the opposite direction of the first flat end 102, a second flat end 104 extends from the U-shaped body 110 in the same horizontal plane defined by the storage surface 101, and a second engaging end 105 having a substantially perpendicular flat surface extends from the second flat end 104 to embrace at least partially a second supporting beam underneath the second flat end.

The length l of the formed support member is defined by the shortest distance from the intersectional line defined by the first flat end 102 and the first engaging end 103 to the intersectional line defined by the second flat end 104 and the second engaging end 105. The length l is in the range of from 2 to 44 inches, preferably, from 12 to 20 inches. The length l can be shorter or longer than the specifically recited ranges depending on the dimensions of the storage rack.

The length f of the first flat end 102 is the length of the straight edge of the first flat end 102 which is perpendicular to the intersectional line defined by the first flat end 102 and the first engaging end 103. The length f' of the second flat end 104 is the length of the straight edge of the second flat end 104 which is perpendicular to the intersectional line defined by the second flat end 104 and the second engaging end 105. The length f and f' are in the range of from 1 to 20 inches. The length f and f' can be shorter or longer than the specifically recited ranges depending on the dimensions of the storage rack, the weight of the load, the material of the formed support member and other unrecited factors.

The width e of the first flat end 102 is the length of the intersectional line defined by the first flat end 102 and the first engaging end 103. The width e' of the second flat end 104 is the length of the intersectional line defined by the second flat end 104 and the second engaging end 105. The width e and e' are in the range of from 1 to 10 inches. The width e and e' can be shorter or longer than the specifically recited ranges depending on the dimensions of the storage rack, the weight of the load, the material of the formed support member and other unrecited factors.

The height k of the first engaging end 103 and the height k' of the second engaging end 105 are in the range of from 1 to 20 inches. The height k and k' can be shorter or longer than the specifically recited ranges depending on the dimensions of the storage rack, the weight of the load, the material of the formed support member and other unrecited factors.

Figure 2:
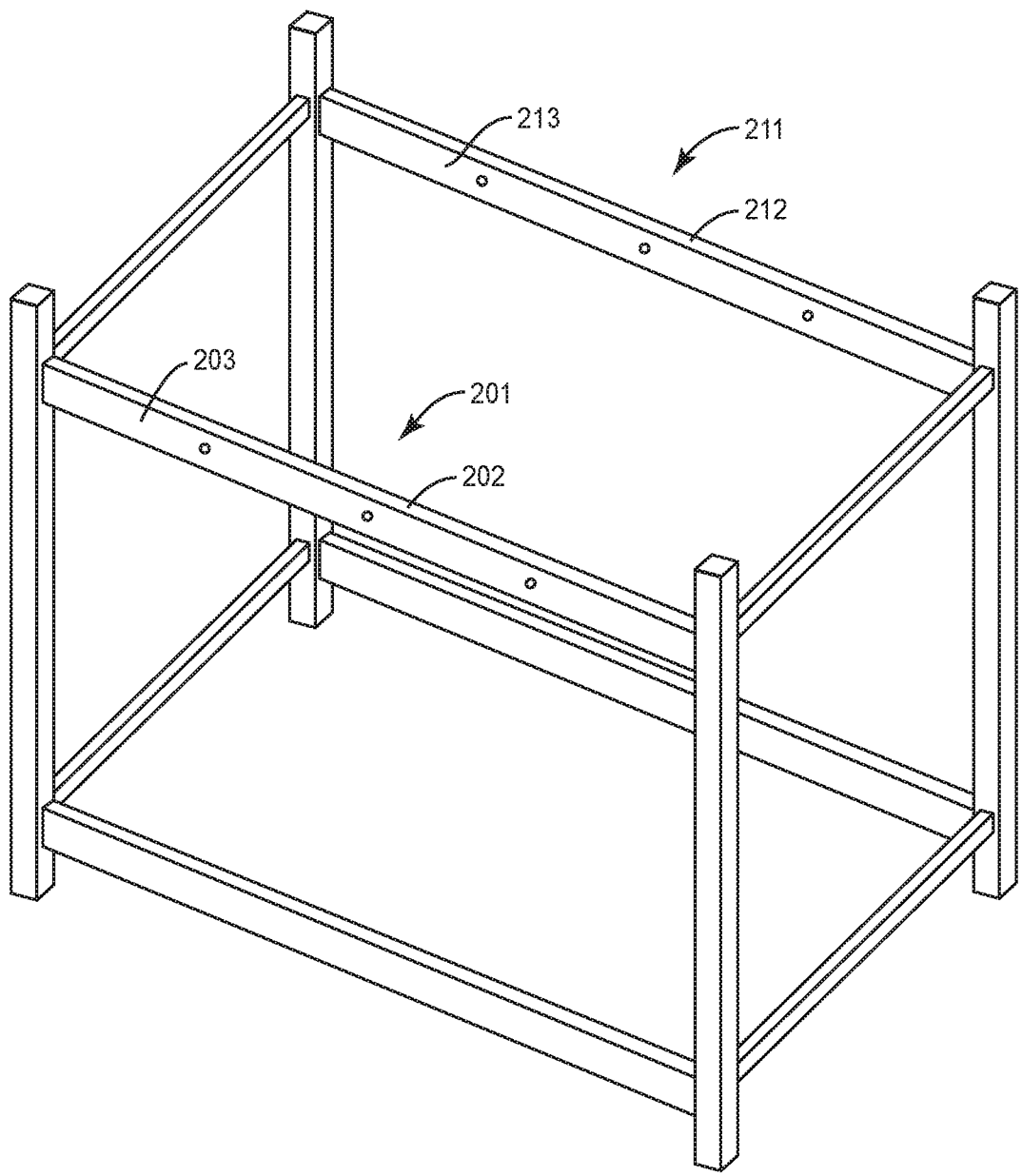
FIG. 2 illustrates a storage rack having two supporting beams on which a formed support member in accordance with aspects of the present disclosure can be used.

FIG. 2 illustrates a storage rack having two supporting beams on which a formed support member in accordance with aspects of the present disclosure can be used. The first support beam 201 has a first support surface 202 along a longitudinal axis and a first side surface 203 substantially perpendicular to the first support surface 202. The second support beam 211 has a second support surface 212 along a longitudinal axis and a second side surface 213 substantially perpendicular to the second support surface 202.

FIG. 2 also illustrates that holes can be drilled on the side surfaces 203 of the first support beam 201 and the side surface 213 of the second support beam 211 to fasten the formed support member of the present invention. For stability reason, the hole is drilled in the middle of the side surface 203 and in a direction paralleling the first support surface 202, and in the middle of the side surface 213 in a direction paralleling the second support surface 212 and with the same distance from the top and the bottom. For example, when the side surface 203 or 213 has a height of three inches, the side surface 203 or 213 has one hole positioned at one and a half inch from the top and the bottom of the side surface 203 or 213. When the side surface 203 or 213 has a height of three and one-half inches, the side surface 203 or 213 has one hole positioned at one and three quarters inch from the top and the bottom of the side surface 203 or 213. When the side surface 203 or 213 has a height of four inches, the side surface 203 or 213 has one hole positioned at two inches from the top and the bottom of the side surface 203 or 213.

Figure 3:
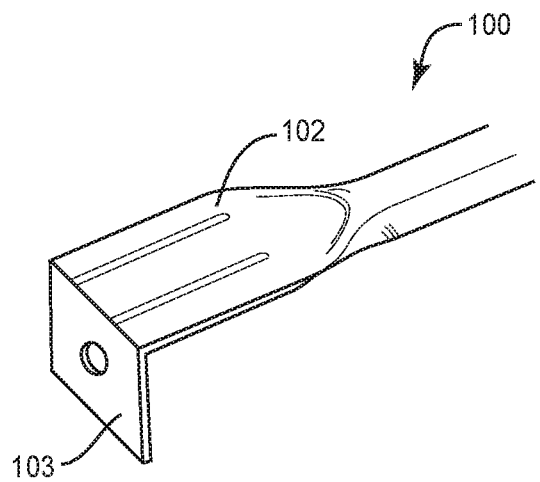
FIG. 3 illustrates a second embodiment of a formed support member of the storage rack in accordance with aspects of the present disclosure.
Figure 4:
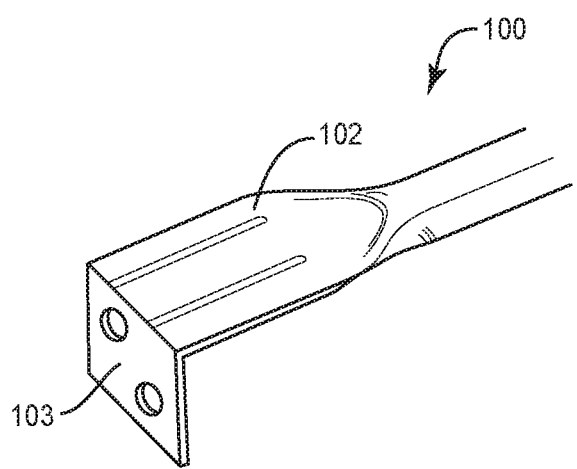
FIG. 4 illustrates a third embodiment of a formed support member of the storage rack in accordance with aspects of the present disclosure.
Figure 5:
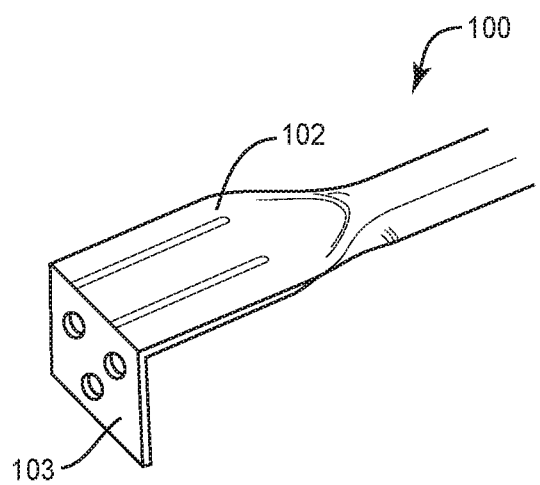
FIG. 5 illustrates a fourth embodiment of a formed support member of the storage rack in accordance with aspects of the present disclosure.

FIGS. 3-5 illustrate three embodiments of formed support members of the storage rack in accordance with aspects of the present disclosure. In particular, FIG. 3 illustrates a formed support member 100 having one hole drilled on the first engaging end 103. The second engaging end 105, which is not shown in FIG. 3, would also have one hole drilled in the middle. In one embodiment, the single hole may be positioned at one and a half inch from the intersectional line defined by the first flat end 102 and the first engaging end 103. Such hole on the first and second engaging ends 103 and 105 can be aligned with at least one hole on the first and second side surface 203 and 213 of the first and second support beams 201 and 211 having a height of three inches. In another embodiment, the single hole may be positioned at one and three quarters inch from the intersectional line defined by the first flat end 102 and the first engaging end 103. Such hole on the first and second engaging ends 103 and 105 can be aligned with at least one hole on the first and second side surface 203 and 213 of the first and second support beams 201 and 211 having a height of three and one-half inches. In a further embodiment, the single hole may be positioned at two inches from the intersectional line defined by the first flat end 102 and the first engaging end 103. Such hole on the first and second engaging ends 103 and 105 can be aligned with at least one hole on the first and second side surface 203 and 213 of the first and second support beams 201 and 211 having a height of four inches.

FIG. 4 illustrates a formed support member 100 having two holes drilled on the first engaging end 103. The second engaging end 105, which is not shown in FIG. 4, would also have two holes drilled on the second engaging end 105. In one embodiment, one of the two holes may be positioned at one and a half inch from the intersectional line defined by the first flat end 102 and the first engaging end 103, while another hole may be positioned at one and three quarters inch from the intersectional line defined by the first flat end 102 and the first engaging end 103. At least one hole in such combination of the two holes on the first and second engaging ends 103 and 105 can be aligned with at least one hole on the first and second side surface 203 and 213 of the first and second support beams 201 and 211 having a height of three inches or three and one-half inches. In another embodiment, one of the two holes may be positioned at one and a half inch from the intersectional line defined by the first flat end 102 and the first engaging end 103, while another hole may be positioned at two inches from the intersectional line defined by the first flat end 102 and the first engaging end 103. At least one hole in such combination of the two holes on the first and second engaging ends 103 and 105 can be aligned with at least one hole on the first and second side surface 203 and 213 of the first and second support beams 201 and 211 having a height of three inches or four inches. In a further embodiment, one of the two holes may be positioned at one and three quarters inch from the intersectional line defined by the first flat end 102 and the first engaging end 103, while another hole may be positioned at two inches from the intersectional line defined by the first flat end 102 and the first engaging end 103. At least one hole in such combination of the two holes on the first and second engaging ends 103 and 105 can be aligned with at least one hole on the first and second side surface 203 and 213 of the first and second support beams 201 and 211 having a height of three and one-half inches or four inches.

FIG. 5 illustrates a formed support member 100 having three holes drilled on the first engaging end 103. The second engaging end 105, which is not shown in FIG. 5, would also have three holes drilled on the second engaging end 105. The first of the three holes may be positioned at one and a half inch from the intersectional line defined by the first flat end 102 and the first engaging end 103, the second of the three holes may be positioned at one and three quarters inch from the intersectional line defined by the first flat end 102 and the first engaging end 103, and the third of the three holes may be positioned at two inches from the intersectional line defined by the first flat end 102 and the first engaging end 103. At least one hole in such combination of the three holes on the first and second engaging ends 103 and 105 can be aligned with at least one hole on the first and second side surface 203 and 213 of the first and second support beams 201 and 211 having a height of three inches, three and one-half inches, and four inches. Therefore, the combination of three holes on the formed support member can accommodate the support beams of different sizes.

Figure 6:
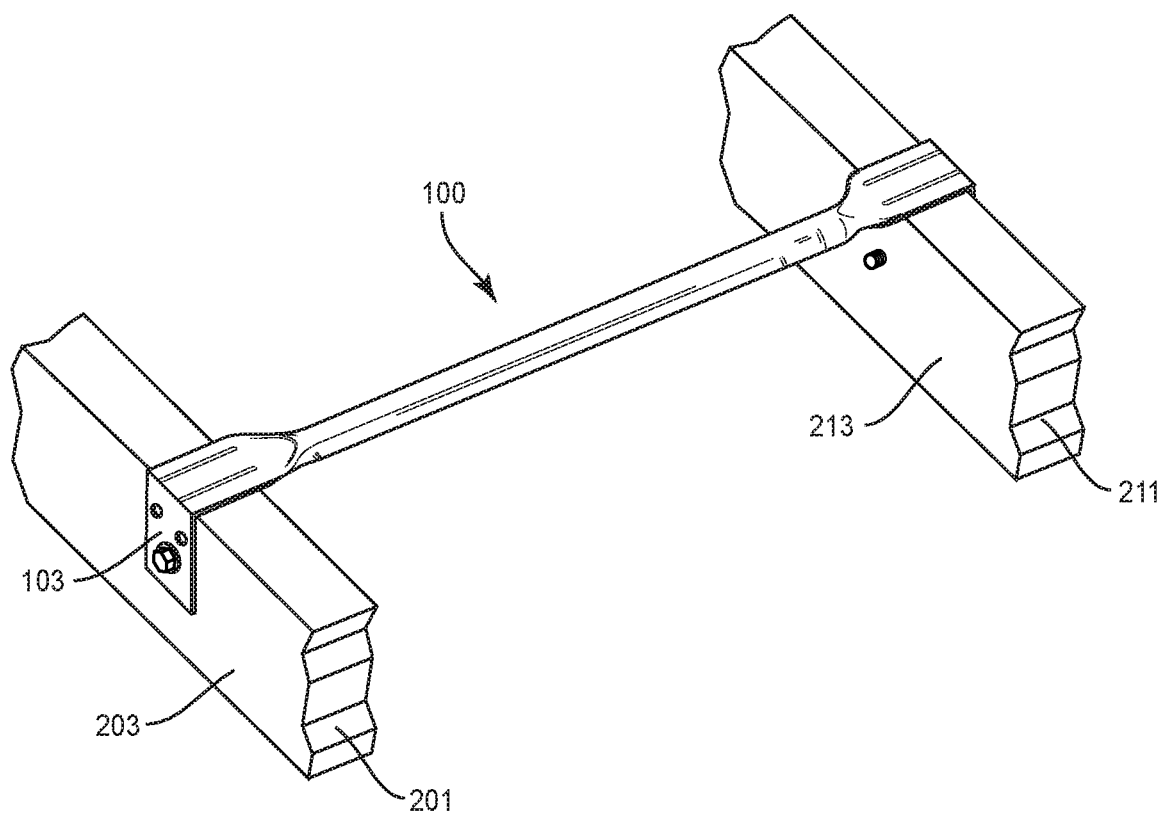
FIG. 6 illustrates one embodiment of a formed support member in accordance with aspects of the present disclosure being fastened on a storage rack.

FIG. 6 illustrates one embodiment of a formed support member 100 in accordance with aspects of the present disclosure being fastened on a storage rack. FIG. 6 demonstrates a formed support member 100 having three holes on each of the first and second engaging ends 103 and 105 (as illustrated in FIG. 5) and with one hole being aligned with and fastened to at least one hole on the first and second side surface 203 and 213 of the first and second support beams 201 and 211 having a height of three inches, three and one-half inches, or four inches.

Figure 7:
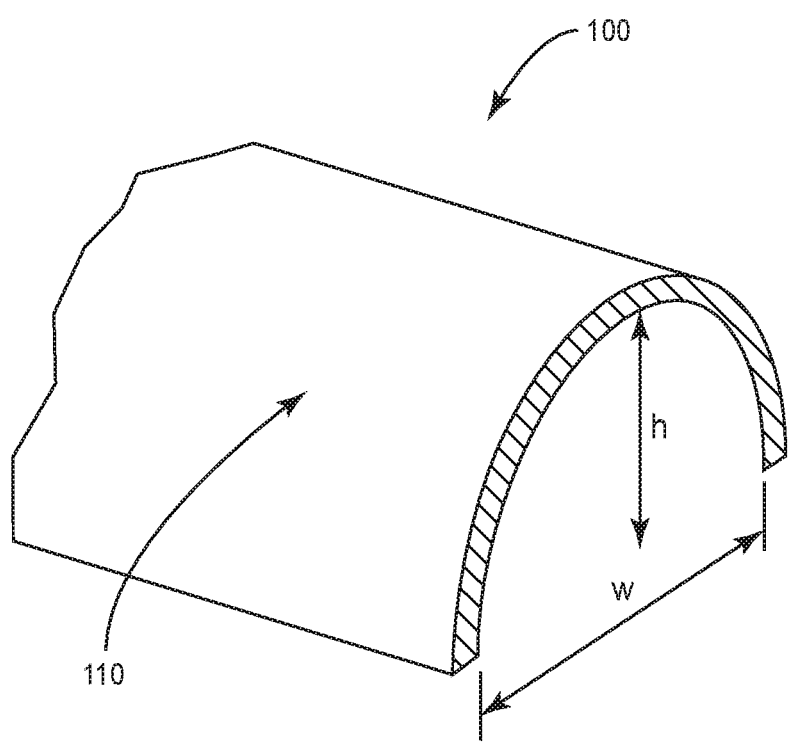
FIG. 7 illustrates a cross sectional view of a formed support member showing the U-shaped body.

FIG. 7 illustrates a cross sectional view along plane A (see FIG. 1) of a formed support member 100 showing the downwardly facing U-shaped body 110. The cross section has a width w in the range of from 1 to 5 inches and a height h in the range of from 1 to 5 inches. The width w and the height h can be shorter or longer than the specifically recited ranges depending on the dimensions of the storage rack, the weight of the load, the material of the formed support member and other unrecited factors.

The first engaging end 103 and the second engaging end 105 of the formed support member of present invention are securable to the underneath the first support beams 201 and the second support beams 211. The immobilization means for immobilizing the first engaging end 103 and the second engaging end 105 of the formed support member to the first support beams 201 and the second support beams 211 is selected from a group consisting of screw, nut and bolt.

The formed support member can be fabricated from suitable materials, including, but not limited to, metal(s), alloy(s), or combinations thereof, etc. Suitable metals include aluminium, copper, iron, tin, lead, titanium, zinc and etc. Suitable alloys including steel, solder, brass, pewter, duralumin, bronze, amalgams and etc. The formed support member may be fabricated from a single material or a combination of materials, including, but not limited to, the above exemplary materials, to achieve various desired characteristics such as strength, rigidity, performance and durability.

The present disclosure is advantageous because the formed support member is universal in that a single structural member may be manufactured and adaptable for multiple sizes of storage racks. In particular, storage racks that have horizontal support beams that are three inches, four inches, or three and a half inches may be utilized. Thus, the ability to use the same formed support member for each sized storage rack provides for easier manufacturing and predictability in terms of making the support member.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A formed support member, comprising:
    a central portion having a downwardly facing U-shaped body elongated in an axial direction along a horizontal axis to form an upwardly facing storage surface, the U-shaped body having a curved surface with a U-shaped cross section and an upwardly facing apex;
    a first flat end extended from the U-shaped body in a first direction along the horizontal axis and in a horizontal plane defined by the storage surface;
    a first engaging end, extended from the first flat end in a direction substantially perpendicular to the horizontal plane and adapted to embrace at least partially a first supporting beam positionable underneath the first flat end;
    a second flat end extended from the U-shaped body in a second direction opposite the first direction and in the horizontal plane defined by the storage surface; and
    a second engaging end extended from the second flat end in a direction substantially perpendicular to the horizontal plane and adapted to embrace at least partially a second supporting beam positionable underneath the second flat end.

2. The formed support member of claim 1, wherein the first engaging end and the second engaging end each define a single hole therethrough.

3. The formed support member of claim 2, in combination with the first and second support beams, wherein the single hole on the first engaging end is positioned at one and a half inch from an intersectional line defined by the first flat end and the first engaging end, the single hole on the second engaging end is positioned at one and a half inch from an intersectional line defined by the second flat end and the second engaging end, and the holes on the first engaging end and the second engaging end align with holes positioned at center of the first and second support beams having a height of three inches.

4. The formed support member of claim 2, in combination with the first and second support beams, wherein the single hole on the first engaging end is positioned at one and three quarters inch from an intersectional line defined by the first flat end and the first engaging end, the single hole on the second engaging end is positioned at one and three quarters inch from an intersectional line defined by the second flat end and the second engaging end, and the holes on the first engaging end and the second engaging end align with holes positioned at center of the first and second support beams having a height of three and one-half inches.

5. The formed support member of claim 2, in combination with the first and second support beams, wherein the single hole on the first engaging end is positioned at two inches from an intersectional line defined by the first flat end and the first engaging end, the single hole on the second engaging end is positioned at two inches from an intersectional line defined by the second flat end and the second engaging end, and the holes on the first engaging end and the second engaging end align with holes positioned at center of the first and second support beams having a height of four inches.

6. The formed support member of claim 1, wherein the first engaging end and the second engaging end each define a first hole and a second hole therethrough.

7. The formed support member of claim 6, in combination with the first and second support beams, wherein the first hole on the first engaging end is positioned at one and a half inch from an intersectional line defined by the first flat end and the first engaging end, the first hole on the second engaging end is positioned at one and a half inch from an intersectional line defined by the second flat end and the second engaging end, and the first holes on the first engaging end and the second engaging end align with holes positioned at center of the first and second support beams having a height of three inches; and the second hole on the first engaging end is positioned at one and three quarters inch from an intersectional line defined by the first flat end and the first engaging end, the second hole on the second engaging end is positioned at one and three quarters inch from an intersectional line defined by the second flat end and the second engaging end, and the second holes on the first engaging end and the second engaging end align with holes positioned at center of the first and second support beams having a height of three and one-half inches.

8. The formed support member of claim 6, in combination with the first and second support beams, wherein the first hole on the first engaging end is positioned at one and a half inch from an intersectional line defined by the first flat end and the first engaging end, the first hole on the second engaging end is positioned at one and a half inch from an intersectional line defined by the second flat end and the second engaging end, and the first holes on the first engaging end and the second engaging end align with holes positioned at center of the first and second support beams having a height of three inches; and the second hole on the first engaging end is positioned at two inches from an intersectional line defined by the first flat end and the first engaging end, the second hole on the second engaging end is positioned at two inches from an intersectional line defined by the second flat end and the second engaging end, and the second holes on the first engaging end and the second engaging end align with holes positioned at center of the first and second support beams having a height of four inches.

9. The formed support member of claim 6, in combination with the first and second support beams, wherein the first hole on the first engaging end is positioned at one and three quarters inch from an intersectional line defined by the first flat end and the first engaging end, the first hole on the second engaging end is positioned at one and three quarters inch from an intersectional line defined by the second flat end and the second engaging end, and the first holes on the first engaging end and the second engaging end align with holes positioned at center of the first and second support beams having a height of three and one-half inches; and the second hole on the first engaging end is positioned at two inches from an intersectional line defined by the first flat end and the first engaging end, the second hole on the second engaging end is positioned at two inches from an intersectional line defined by the second flat end and the second engaging end, and the second holes on the first engaging end and the second engaging end align with holes positioned at center of the first and second support beams having a height of four inches.

10. The formed support member of claim 1, wherein the first engaging end and the second engaging end each define a first hole, a second hole and a third hole therethrough.

11. The formed support member of claim 10, in combination with the first and second support beams, wherein the first hole on the first engaging end is positioned at one and a half inch from an intersectional line defined by the first flat end and the first engaging end, the first hole on the second engaging end is positioned at one and a half inch from an intersectional line defined by the second flat end and the second engaging end, and the first holes on the first engaging end and the second engaging end align with holes positioned at center of the first and second support beams having a height of three inches;

the second hole on the first engaging end is positioned at one and three quarters inch from an intersectional line defined by the first flat end and the first engaging end, the second hole on the second engaging end is positioned at one and three quarters inch from an intersectional line defined by the second flat end and the second engaging end, and the second holes on the first engaging end and the second engaging end align with holes positioned at center of the first and second support beams having a height of three and one-half inches; and the third hole on the first engaging end is positioned at two inches from an intersectional line defined by the first flat end and the first engaging end, the third hole on the second engaging end is positioned at two inches from an intersectional line defined by the second flat end and the second engaging end, and the third holes on the first engaging end and the second engaging end align with holes positioned at center of the first and second support beams having a height of four inches.

12. The formed support member of claim 11, wherein the central body, flat ends and engaging ends are all formed from a single piece of material.

13. The formed support member of claim 12, wherein the transition from the central body to the first and second flat ends is curved.

14. The formed support member of claim 1, wherein the first engaging end and the second engaging end are adapted to be securable to the first and second support beam.

15. The formed support member of claim 1, and comprising immobilization means for immobilizing the formed support member with respect to the first or second support beam.

16. The formed support member of claim 15, wherein the immobilization means comprises a screw, a nut or a bolt.

17. The formed support member of claim 1, wherein the central body, first and second flat ends and first and second engaging ends are all formed from a single piece of material.

18. The formed support member of claim 1, wherein the central body has a substantially uniform cross section.

19. The formed support member of claim 1, wherein the transition from the central body to the first and second flat ends is curved.

* * * * *